United States Patent [19]
Moote et al.

[11] Patent Number: 5,735,171
[45] Date of Patent: Apr. 7, 1998

[54] PIVOT JOINT WITH RETAINER CLIP

[75] Inventors: Donald B. Moote, Lake Orion, Mich.; Kris B. Rogers, Toronto, Canada; Andrew C. Stewart, Lake Orion, Mich.; Frank R. Varela, Etobicoke, Canada; Michael W. Boles, Grand Blanc; Gerald McLean, South Lyon, both of Mich.; Teodor G. Nedelcu, Willowdale, Canada

[73] Assignee: ITT Corporation, New York, N.Y.

[21] Appl. No.: 441,664

[22] Filed: May 15, 1995

Related U.S. Application Data

[60] Division of Ser. No. 143,939, Oct. 27, 1993, and a continuation-in-part of Ser. No. 143,479, Oct. 26, 1993, Pat. No. 5,449,258.

[51] Int. Cl.⁶ .................................................. B60S 1/18
[52] U.S. Cl. ..................... 74/42; 15/250.31; 15/250.34; 411/521
[58] Field of Search ........................... 74/42, 43; 29/434; 15/250.31, 250.34; 411/516, 517, 520, 521, 525, 526, 918

[56] References Cited

U.S. PATENT DOCUMENTS

| | | |
|---|---|---|
| 32,360 | 3/1861 | Pierce . |
| 913,024 | 2/1909 | Meacham . |
| 1,460,749 | 7/1923 | Dull . |
| 1,675,277 | 6/1928 | Roe . |
| 1,752,982 | 4/1930 | Herold . |
| 1,890,348 | 12/1932 | Weatherhead, Jr. . |
| 2,004,182 | 6/1935 | Arey . |
| 2,169,181 | 8/1939 | Kost . |
| 2,521,567 | 9/1950 | Corrigan et al. . |
| 2,568,584 | 9/1951 | Hartman . |
| 2,687,228 | 8/1954 | Knocke . |
| 2,712,262 | 7/1955 | Knohl . |
| 2,799,202 | 7/1957 | Patten . |
| 2,831,368 | 4/1958 | Collins et al. . |
| 2,880,641 | 4/1959 | Sislik . |
| 3,036,793 | 5/1962 | Becker . |
| 3,108,371 | 10/1963 | Munse . |
| 3,320,846 | 5/1967 | Orain . |

(List continued on next page.)

FOREIGN PATENT DOCUMENTS

| | | |
|---|---|---|
| 17799 | 3/1978 | Australia . |
| 0511832 | 11/1992 | European Pat. Off. . |
| 2114130 | 6/1972 | France . |
| 2107706 | 10/1972 | Germany . |
| 8232482 | 6/1983 | Germany . |
| 3305419 | 8/1984 | Germany . |
| 3722243 | 1/1989 | Germany . |
| 4028892 | 3/1992 | Germany . |
| 351464 | 2/1961 | Switzerland . |
| 682578 | 11/1952 | United Kingdom . |
| 753413 | 7/1956 | United Kingdom . |
| 1071565 | 6/1967 | United Kingdom . |
| 2157786 | 10/1985 | United Kingdom . |

OTHER PUBLICATIONS

Machinery, vol. 105, Nov. 18, 1964, pp. 1180–1187.

*Primary Examiner*—Rodney H. Bonck
*Assistant Examiner*—Troy Grabow
*Attorney, Agent, or Firm*—Thomas N. Twomey; J. Gordon Lewis

[57] ABSTRACT

A pivot joint includes a housing surrounding a rotatable shaft. A retainer clip frictionally engages the shaft and seats against one end of the housing to fixedly axially position the rotatable shaft and the housing with respect to each other and to a rotatable lever connected to one end of the rotatable shaft. In one embodiment, the rotatable shaft is hardened and the retainer clip is hardened to a higher hardness than the hardness of the rotatable shaft. In another embodiment, a pair of retainer clips frictionally engage opposite ends of the rotatable shaft and seat against the rotatable lever and one end of the housing to form a fixed dimensional relationship between the housing, the rotatable shaft and the lever. The retainer clip may include notches formed on the edge of a frusto-conical annulus surrounding a central aperture in the retainer clip to form a discontinuous shaft engaging surface.

28 Claims, 3 Drawing Sheets

U.S. PATENT DOCUMENTS

| | | |
|---|---|---|
| 3,448,494 | 6/1969 | Boyenval et al. . |
| 3,481,381 | 12/1969 | Black . |
| 3,679,276 | 7/1972 | Stenlund . |
| 3,779,659 | 12/1973 | Habert . |
| 4,157,725 | 6/1979 | Stanaitis . |
| 4,163,680 | 8/1979 | Syrchikov et al. . |
| 4,385,431 | 5/1983 | Holton . |
| 4,620,356 | 11/1986 | Maus et al. . |
| 4,776,740 | 10/1988 | Holton . |
| 4,834,603 | 5/1989 | Holton . |
| 5,007,781 | 4/1991 | Jensen et al. . |
| 5,056,182 | 10/1991 | Fukumoto et al. ............... 15/250.34 X |
| 5,067,198 | 11/1991 | Ishikawa et al. . |
| 5,182,957 | 2/1993 | Bohmer et al. . |
| 5,320,578 | 6/1994 | Burton et al. .................... 15/250.34 X |

PIVOT JOINT WITH RETAINER CLIP

CROSS-REFERENCE TO RELATED APPLICATIONS

This application is a division of application Ser. No. 08/143,939, filed on Oct. 27, 1993, and a continuation-in-part of application Ser. No. 08/143,479, filed on Oct. 26, 1993, now U.S. Pat. No. 5,449,258.

BACKGROUND OF THE INVENTION

Field of the Invention

The present invention relates, in general, to pivot joints and, specifically, to pivot joints with retainer clips and, even more specifically, to windshield wiper pivot joints with retainer clips.

In a windshield wiper pivot joint, a rotatable shaft is connected by a lever to an oscillating rod driven by a motor. A windshield wiper is mounted on one end of the rotatable shaft. A housing surrounds the rotatable shaft and is typically biased in one direction by a spring washer mounted between the housing and the lever. A C-clip is mountable in a recess formed in a second end of the rotatable shaft. Due to tolerance build-up of the components of the pivot joint, a number of separate washers or shims are typically mounted between the C-clip and one end of the housing so as to provide a tight assembly which ensures a smooth operating pivot joint.

The need for the addition of multiple shims or washers to take up excessive axial play between the housing and the C-clip on the rotatable shaft requires additional labor and components during the assembly on each pivot joint. Thus, it would be desirable to provide a retainer clip for a pivot joint, such as a windshield wiper pivot joint, which requires less labor and fewer components than previously devised pivot joints.

Previously, windshield wiper pivot joints have used a nickel-plated rotatable shaft. Environmental concerns has indicated a need to decrease plating operations. Thus, it would also be desirable to provide a pivot joint which does not require a plated surface on a rotatable shaft.

SUMMARY OF THE INVENTION

The present invention is a pivot joint comprising a rotatable shaft having first and second ends. Means are connected to the shaft for bi-directionally rotating the shaft about a longitudinal axis extending between the first and second ends of the shaft. A housing surrounds the shaft. Retainer clip means is fixedly mounted about one end of the shaft and engages the housing.

The retainer clip preferably comprises an annular disc having a generally central aperture surrounded by a frusto-conical annulus. The edge of the annulus surrounding the aperture forms a shaft engaging surface which frictionally engages the shaft to hold the housing against axial movement with respect to the rotatable shaft. The rotatable shaft is fixedly connected at one end to the rotatable lever to be rotatable with the lever with respect to the housing.

Preferably, the pivot joint of the present invention further includes biasing means mounted between a bearing washer mounted at an opposite end of the housing and the lever for biasing the housing away from the lever. Preferably, the biasing means comprises a wave washer mounted about one end of the rotatable shaft.

In an alternate embodiment, a pair of retainer clips frictionally engage opposite ends of the rotatable shaft. One of the retainer clips seats against the rotatable lever and engages the shaft; while the other retainer clip frictionally engages an opposite end of the rotatable shaft.

Both embodiments of the present invention provide a simple, low cost pivot joint which eliminates the need for shim washers to prevent excessive axial movement of the housing with respect to the rotatable shaft or to a rotatable drive lever or link connected to the shaft. The retainer clip is easily inserted over one end of the rotatable shaft and brought into frictional engagement with the shaft and in contact with the bearing washer mounted at one end of the housing surrounding the shaft. This arrangement also eliminates the need for an annular recess in the rotatable shaft for receiving a C-clip.

In a specific application, the pivot joint of the present invention is ideally suited for use in a windshield wiper pivot assembly wherein a windshield wiper is fixedly connected to one end of the rotatable shaft. The other end of the shaft is fixedly connected to a rotatable lever or link which is bi-directionally rotated by an oscillating lever moved by a drive motor.

In another embodiment, the rotatable shaft is hardened to a predetermined hardness by nitriding or tenifering. The retainer clip or clips are likewise hardened, but to a hardness greater than the hardness of the rotatable shaft to ensure solid frictional engagement between each retainer clip and the rotatable shaft.

By hardening the shaft and retainer clip, the prior use of nickel plating on the shaft is eliminated thereby reducing the cost of the pivot joint and avoiding the cost and environmental concerns associated with such nickel coatings while still providing a high strength, long life pivot joint.

BRIEF DESCRIPTION OF THE DRAWINGS

The various features, advantages and other uses of the present invention will become more apparent by referring to the following detailed description and drawing in which.

DESCRIPTION OF THE PREFERRED EMBODIMENTS

Figures 1, 2:
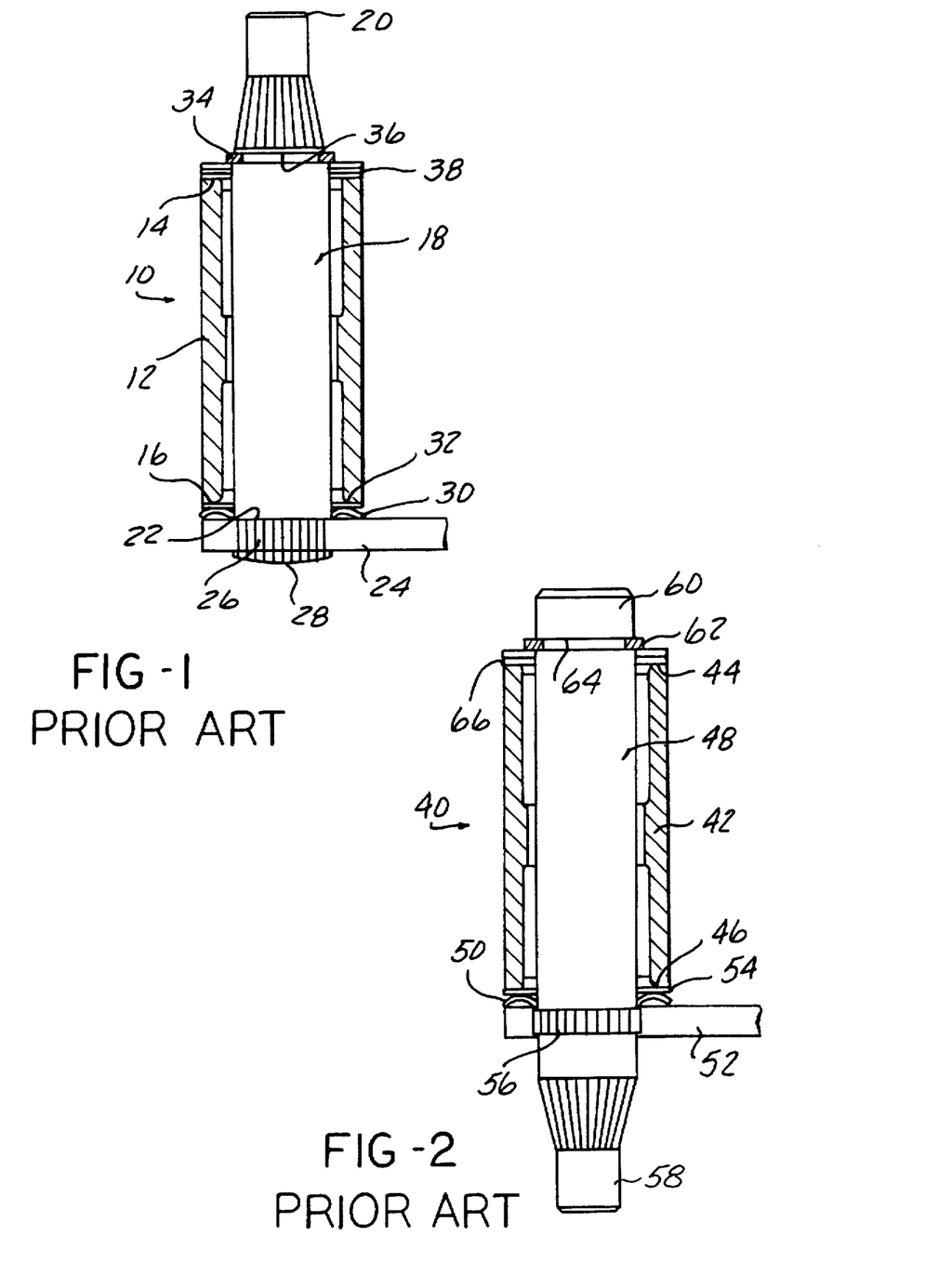
FIG. 1 is a partially cross-sectioned, side elevational view of a first prior art windshield wiper pivot joint.
FIG. 2 is a partially cross-sectioned, side elevational view of another prior art windshield wiper pivot joint.

Referring now to the drawing, to FIG. 1 in particular, there is depicted one embodiment of a prior art pivot joint particularly devised for use as a windshield wiper pivot joint for rotatably connecting a windshield wiper to a rotatable lever. The pivot joint 10 includes a tubular, generally cylindrical, hollow housing 12 having opposed first and second ends 14 and 16, respectively. The housing 12 is formed of any suitable material, such as a plastic, or a metal, such as a zinc die casting.

A rotatable shaft 18 has a first end 20 and an opposed second end 22. The rotatable shaft 18 has a cylindrical, tubular form and is typically formed of a metal, such as steel, having an exterior nickel plating or coating. The second end 22 of the rotatable shaft 18 is fixedly connected to a rotatable lever 24 by suitable means, such as by an orbital rivet 26. Typically, the orbital rivet 26 is formed as an integral extension of the second end 22 of the rotatable shaft 18 and has an outer end 28 swaged into fixed engagement with the lever 24.

By way of background only, the lever 24 typically comprises a short metallic link which is connected at an opposite end to an oscillatory rod driven by a drive motor, both not shown. The embodiment shown in FIG. 1 depicts a so-called bottom mounted windshield wiper pivot joint since, in a typical mounting orientation on the fire wall of a vehicle, the bottom or second end 22 of the rotatable shaft 18 is connected to the rotatable lever 24. The opposed first end 20 of the rotatable shaft 18 extends outward from the lever 24 and receives a conventional windshield wiper, not shown, thereon. The windshield wiper is secured to the first end 20 of the rotatable shaft 18 by suitable fastening means.

As shown in FIG. 1, a biasing means, such as a spring or wave washer 30, is mounted about the second end 22 of the rotatable shaft 18 and seats on the lever 24. A bearing washer 32 is disposed between the wave washer 30 and the second end 16 of the housing 12.

The housing 12 is fixedly connected to the rotatable shaft 18 by a C-clip 34 which snaps into an annular recess 36 formed in the rotatable shaft 18. Due to the build-up of tolerances in the manufacture and assembly of the rotatable shaft 18 and the housing 12, as well as to prevent excessive axial movement of the housing 12 with respect to the rotatable shaft 18 and the lever 24, a plurality, such as two, three or more shims or bearing washers 38, are mounted in a stack between the recess 36 for the C-clip 34 on the rotatable shaft 18 and the first end 14 of the housing 12. The number of bearing washers 38 needed depends on the distance between the recess 36 for the C-clip 34 and the housing 12. The washers 38 are added in the appropriate number so as to bring the accumulated stack or build-up of such washers 38 into substantial registry with the C-clip 34 when the C-clip 34 is mounted in the recess 36 on the rotatable shaft 18.

FIG. 2 represents a prior art embodiment of a so-called top mounted windshield wiper pivot joint 40. The pivot joint 40 is substantially similar to the pivot joint 10 shown in FIG. 1 and described above in that it includes a hollow, cylindrical housing 42 which surrounds a rotatable shaft 48. The housing 42 has a first end 44 and an opposed second end 46. A biasing means, such as a wave washer 50, is seated between a rotatable lever 52 and a bearing washer 54. The bearing washer 54 is disposed between the wave washer 50 and the second end 46 of the housing 42.

In this embodiment, a plurality of splines 56 are formed on the rotatable shaft 48 adjacent the first end 58 of the rotatable shaft 48. The splines 56 are mounted within an aperture formed in the lever 52, with the surrounding portions of the lever 52 bounding the aperture being swaged or ring-stamped into fixed contact with the splines 56 to fixedly secure the rotatable shaft 48 to the rotatable lever 52 for simultaneous rotation when the rotatable lever 52 is rotated, as described above for the embodiment shown in FIG. 1.

A C-shaped retainer clip 62 is mounted in an annular recess 64 formed adjacent the second end 60 of the rotatable shaft 48. A plurality of shims or bearing washers 66 are mounted in an appropriate number between the C-clip 62 and the first end 44 of the housing 42 to take up substantially all of the clearance therebetween and to prevent excessive axial movement of the housing 42 between the C-clip 62 and the rotatable lever 52.

Figure 3:
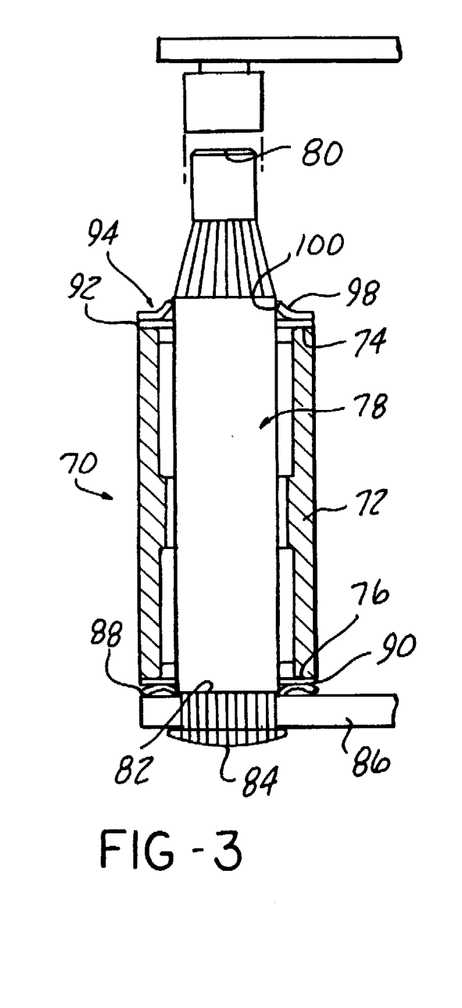
FIG. 3 is a partially cross-sectioned, side elevational view of a pivot joint constructed in accordance with the teachings of one embodiment of the present invention.

Turning now to FIG. 3, there is depicted a pivot joint 70 constructed in accordance with the teachings of a preferred embodiment of the present invention which eliminates the need for multiple shims or bearing washers 38 or 66 in the prior art pivot joints shown in FIGS. 1 and 2. The pivot joint 70 also includes a tubular, hollow cylindrical housing 72 having a first end 74 and an opposed second end 76. A rotatable shaft 78 is mounted in and extends through the housing 72. The rotatable shaft 78 has a first end 80 and an opposed second end 82. An orbital rivet 84 may be employed to fixedly secure the second end 82 of the rotatable shaft 78 to a rotatable lever 86 in the same manner as shown in FIG. 1 and described above.

The pivot joint 70 also includes a biasing means 88, such as a spring or wave washer. A bearing washer 90 is mounted along with the wave washer 88 between the lever 86 and the second end 76 of the housing 72. A single bearing washer 92 is optionally mounted in contact with the first end 74 of the housing 72 to provide a bearing surface for rotation of a retainer clip means 94.

According to the present invention, the retainer clip means 94 is mounted in frictional engagement with the rotatable shaft 78 at a position approximate the first end 80 of the rotatable shaft 78. The retainer clip means 94 frictionally engages the exterior surface of the rotatable shaft 78 and seats against the bearing washer 92 to maintain a fixed dimensional relationship between the rotatable shaft 78, the housing 72 and the rotatable lever 86 so as to prevent axial movement of the housing 72 with respect to the shaft 78 and/or the lever 86.

Figures 4, 5:
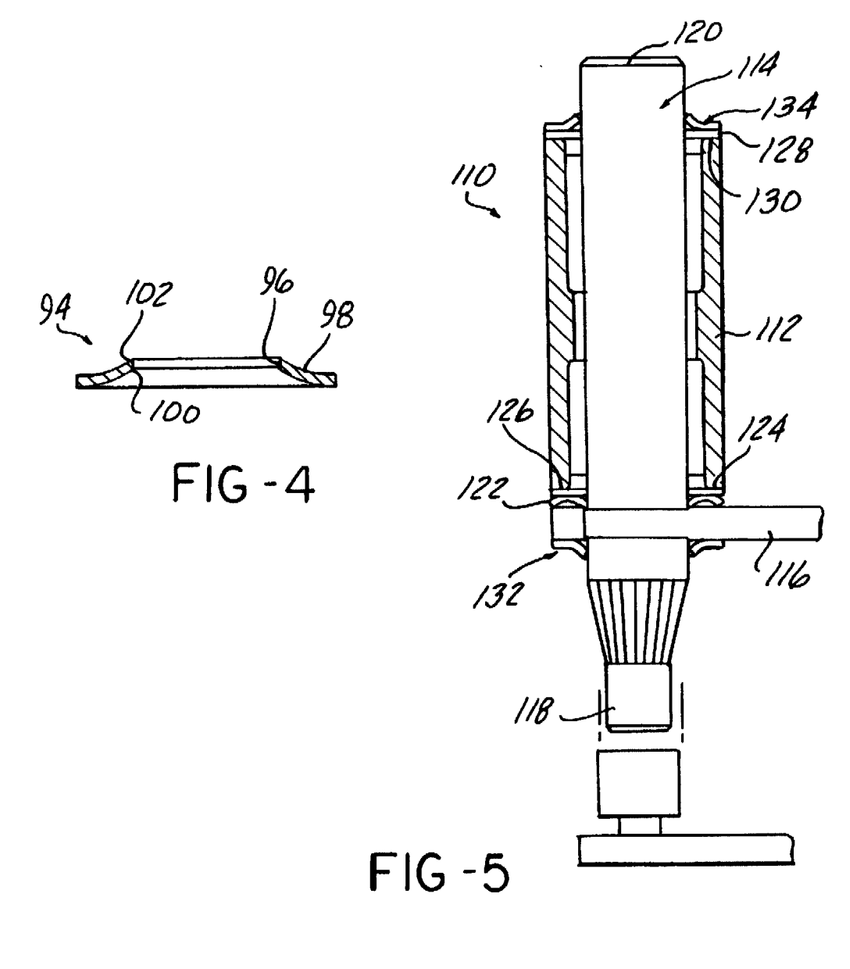
FIG. 4 is a cross-sectional view of a retainer clip shown in FIG. 3.
FIG. 5 is a partially cross-sectioned, side elevational view of another embodiment of a pivot joint according to the present invention.

As shown in detail in FIG. 4, in a preferred embodiment, the retainer clip means 94 comprises an annular body having a centrally located, substantially circular aperture 96 formed therein. A frusto-conical annulus 98 is formed by suitable means in the body 94 and extends from the outer periphery of the body 94 to the aperture 96. During the formation of the frusto-conical annulus 98, the aperture 96 is formed with a shaft engaging edge 100 which has a smaller diameter than a spaced, outermost non-contacting edge 102. The diameter of the aperture 96 at the rotatable shaft engaging edge 100 is slightly smaller than the outer diameter of the rotatable shaft 78 so as to bring the shaft engaging edge 100 into frictional contact with the exterior surface of the rotatable shaft 78 when the body 94 is forcibly urged over the first end 80 of the rotatable shaft 78 as shown in FIG. 3.

The rotatable shaft 78 may be formed of steel with an exterior nickel plating or coating, similar to that described above and shown in FIG. 1. In this embodiment, the retainer clip 94 may be formed of a suitable steel so as to securely engage the rotatable shaft 78.

In assembling the pivot joint 70, the rotatable shaft 78 is first fixedly connected to the rotatable lever 86 by means of a suitable fastener or fastening process, such as by the orbital rivet 84. The biasing wave washer 88, the bearing washer 90 and the housing 72 are then sequentially mounted about the rotatable shaft 78. The other bearing washer 92 is then mounted about the rotatable shaft 78 in contact with the first end 74 of the housing 72. The retainer clip means or disc 94 is then mounted over the first end 80 of the rotatable shaft 78 and pressed under force into engagement with the bearing washer 92. Release of the application force on the retainer clip 94 causes a slight spring-back of the retainer clip 94 and the housing 72 as determined by the spring force of the wave washer 88. Since the diameter of the shaft engaging edge 100 of the retainer clip 94 is slightly smaller than the outer diameter of the rotatable shaft 78, the shaft engaging edge 100 of the retainer clip 94 frictionally engages the exterior surface of the rotatable shaft 78 to fixedly and substantially non-movably hold the rotatable shaft 78 and the housing 72 in a fixed axial dimensional relationship with respect to each other as well as with respect to the lever 86 without excessive axial movement or play therebetween.

FIG. 5 depicts another embodiment of the present invention wherein a pivot joint 110 is employed in a so-called top mounted windshield wiper arrangement. The pivot joint 110 is substantially the same as the pivot joint 70 described above and shown in FIG. 3 in that a hollow, tubular housing 112 surrounds a rotatable shaft 114 which is fixedly connected to a rotatable lever 116, as described hereafter. The rotatable shaft 114 has a first end 118 and an opposed second end 120 which are arranged as shown in FIG. 5 with respect to the rotatable lever 116. As in the pivot joint 70 shown in FIG. 3, the pivot joint 110 includes a biasing means 122, such as a spring or wave washer, and a bearing washer 124 which are mounted between the lever 116 and one end 126 of the housing 112. A second bearing washer 128 is disposed about the second end 120 of the rotatable shaft 114 in contact with a second end 130 of the housing 112.

In this embodiment, identically formed retainer clips 132 and 134 are employed to fixedly interconnect the rotatable shaft 114, the housing 112 and the rotatable lever 116. The first retainer clip 132, which is identical to the retainer clip 94 shown in FIG. 4, is slipped over the first end 118 of the rotatable shaft 114 and brought into frictional engagement with one surface of the rotatable lever 116. The shaft engaging edge of the retainer clip 132 thereby frictionally engages the exterior surface of the rotatable shaft 114 to fixedly connect the rotatable shaft 114 to the rotatable lever 116. The second retainer clip 134 is slipped over the second end 120 of the rotatable shaft 114 into engagement with the second bearing washer 128. The shaft engaging edge of the second retainer clip 134 frictionally engages the rotatable shaft 114. The first and second retainer clips 132 and 134 thus fixedly engage and retain the rotatable shaft 114 in a fixed axial relationship with respect to the housing 112 and the rotatable lever 116.

In a preferred embodiment, the shaft 78 or 114 is formed of a suitable high strength material, such as stainless steel AISI 410, for example, and, is hardened to a predetermined hardness by suitable means. For example, a conventional heat treatment process may be applied to the shaft 78 or 114, hereafter only shaft 78 being referred to, to harden the entire cross section of the shaft 78. Preferably, the shaft 78 is case or surface hardened by carbonitriding, such as commonly referred to as a tenifer or nitride process. The shaft 78 may be hardened to any suitable hardness level depending upon the needs of a particular application. For use in the exemplary windshield wiper pivot joint shown in FIGS. 3 or 5, the shaft 78 or 114 is hardened to 32–35$R_c$. However, it will be understood that this hardness level is described by way of example only as the shaft 12 may be hardened to any other hardness depending upon the needs of a particular application.

Figure 6:
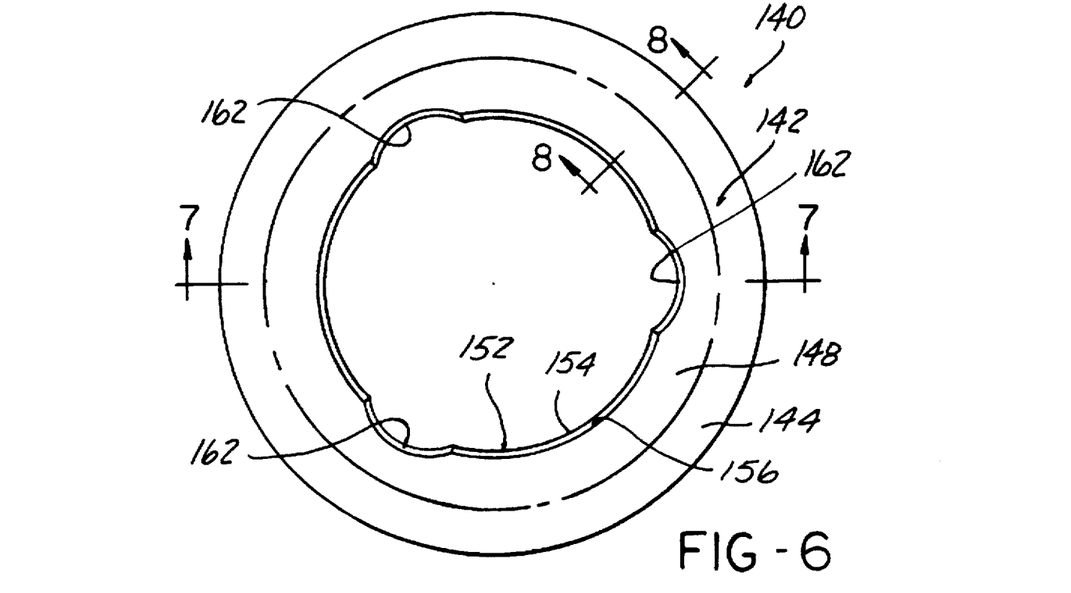
FIG. 6 is an enlarged, plan view of a retainer clip constructed in accordance with the teachings of another embodiment of the present invention.
Figure 7:
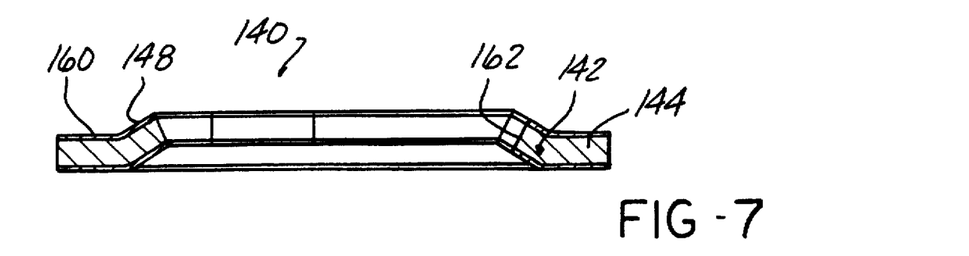
FIG. 7 is an enlarged, cross sectional view generally taken along line 7—7 in FIG. 6.
Figure 8:
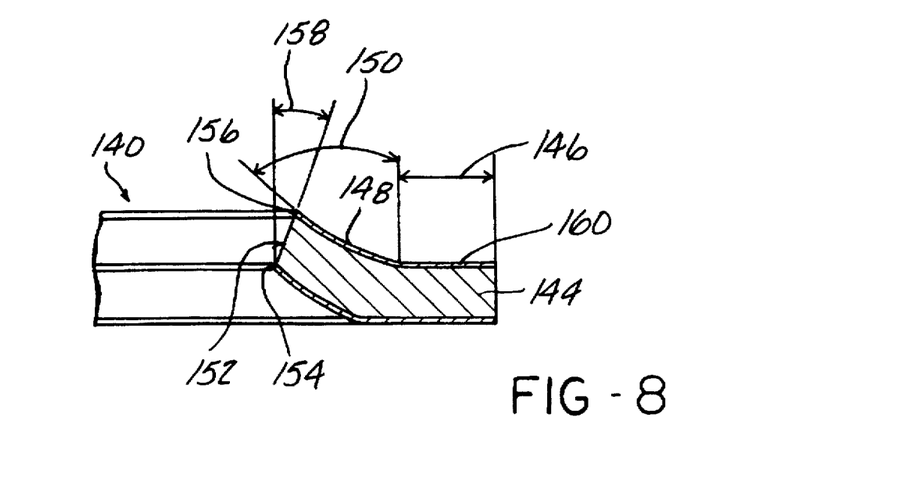
FIG. 8 is an enlarged, cross sectional view of an edge portion of the retainer clip generally taken along line 8—8 in FIG. 7.

Another embodiment of a retainer clip 140 for use with the shaft 78 or 114 is shown in FIGS. 6–8. The retainer clip 140 is formed of a one-piece metallic body 142. Any suitable material, such as steel, stainless steel, etc., may be employed to form the body 142 of the retainer clip 140. By way of example only, the body 142 is formed of carbon steel, AISI 1050. Preferably the body 142 has an annular form or shape obtained by piercing or punching the body 142 from a blank.

The body 142 is formed with an outer, generally planar peripheral edge flange 144. The flange 144 has a predetermined radius as denoted by reference number 146 in FIG. 8. By means of a suitable punching operation, a generally dome shaped, frusto-conical annulus 148 is formed in the body 142 and extends outward from the plane of the outer, peripheral edge flange 144. The frusto-conical annulus 148 may be disposed at any predetermined angle, as denoted by reference number 150 in FIG. 8, with respect to the peripheral flange 144 of the body 142 of the retainer clip 140. By way of example only, forming a radius of between 2.0 and 3.0 mm., with 2.5 mm. being preferred, between the annulus 148 and the top surface of the peripheral edge flange 144 will dispose the top surface of the annulus 148 at an angle of substantially 155° from the top surface of the peripheral edge flange 144.

Simultaneous with or after the frusto-conical annulus 148 is formed in the body 142, an aperture denoted by reference number 152 is formed by piercing, punching, etc., coaxially within the body 142 with respect to the outer edge or O.D. of the peripheral edge flange 144. The peripheral portion of the frusto-conical annulus 148 surrounding the aperture 152 forms a shaft engaging surface which includes two opposed edges, namely a shaft engaging edge or surface 154 of a first diameter and a non-shaft contacting edge or surface 156 of a second diameter larger than the first diameter of the shaft engaging edge 154 due to the annular projection of the annulus 148 out of the plane of the peripheral edge flange 144. As shown in FIG. 8, the shaft engaging surface 154 is disposed at a predetermined angle denoted by reference number 158 from a vertical axis extending through the shaft engaging edge 154 in parallel to a central axis through the body 142 to provide a predetermined amount of locking force to firmly seat and fixedly position the retainer clip 140 on the shaft 78 as well as to provide resiliency or springiness to enable the shaft 78 to be inserted in one direction through the aperture 152 in the body 142 of the retainer clip 140. However, the angle 158 of the peripheral surface of the annulus 148 and the angle 150 of the frusto-conical annulus 148 with respect to the peripheral edge flange 144 are selected to resist movement of the shaft 78 in an opposite direction from the insertion direction of the shaft 78 through the aperture 152 in the body 142.

According to this embodiment, the body 142 of the retainer clip 140 is hardened by suitable heat treatment process, i.e., carbonitriding, tenifering, etc., to a hardness level greater or higher than the hardness of the shaft 78. Thus, in the exemplary use of the shaft 78 in a windshield wiper pivot joint, shown in FIGS. 3 and 4, the retainer clip 140 is hardened to 42–45$R_c$ and stress relieved. Further, the body 142 may be coated with an anti-corrosion coating 160. Such anti-corrosion coating 160 may be formed of any suitable material, such as zinc dichromate, copper oxide, zinc plate, black cadmium, 15 black chromate, etc. The anti-corrosion coating 160 may be applied to the body 142 of the retainer clip 140 by suitable means, such as coating, electrostatic painting, etc.

Further, the body 142 may be coined to provide additional springiness to increase the locking force of the shaft engaging edge 154 on the shaft 78.

In a specific example for use with a shaft 78 having a 12 mm diameter and tenifered to a hardness of 32–35$R_c$, the retainer clip 140, before the optional anti-corrosion coating is applied, has an overall O.D. of 19.90 mm, an inner diameter of 11.75 mm at the shaft engaging edge 154 and a peripheral flange 144 thickness of 1.06 mm. The angle 158 of the shaft engaging surface 154 between the shaft engaging edge 154 and the non-shaft contacting edge 156 and a vertical axis extending through the shaft engaging edge 154 is approximately 19°. With these dimensions and the aforementioned hardness relationship between the retainer clip 140 and the shaft 78, it was found that the retainer clip 140 could withstand a pull out force of 3K newtons.

Another feature of this embodiment is also depicted in FIGS. 6 and 7. In this embodiment, the retainer clip 140 is still hardened to a greater hardness than the hardness of the shaft 78 on which it is to be mounted. However, in this embodiment, the body 142 of the retainer clip 140 is provided with a plurality of notches 162 which are formed in the shaft engaging surface 154 and preferably extend completely from the non-shaft engaging edge 156 to the shaft engaging edge 154 of the aperture 152. Three equi-circumferentially spaced notches 162 are shown in FIG. 6 by way of example only; it being understood that any other number of notches 162 may be formed in the body 142. The notches 162 also may have any shape, such as the generally arcuate shape shown in FIG. 6, with an approximate depth of 0.5 mm., as well as straight sided, generally square, rectangular, triangular shapes, etc. The notches 162 extend radially outward from the aperture 152 into the frusto-conical annulus 148. The notches 162 form discontinuities in the shaft engaging edge 154 of the body 142 and provide a non-continuous shaft engaging edge 154 as shown in FIG. 6.

Prior to assembly, it is preferred that the retainer clip 140 and the shaft 78 be degreased so as to provide the maximum possible retaining force of the retainer clip 140 on the shaft 78.

In summary, there has been disclosed a unique pivot joint which requires fewer parts and eliminates the need for any build-up shims or washers as in previously devised pivot joints, such as pivot joints for windshield wiper mounting applications. By use of a retainer clip having a central aperture surrounded by a frusto-conical annulus, the retainer clip can be easily brought into frictional engagement with the rotatable shaft and, at the same time, bears against a bearing washer and a housing surrounding the shaft to retain the rotatable shaft, the housing and a rotatable lever connected to one end of the rotatable shaft in a fixed dimensional arrangement without excessive axial play or movement of the housing between the retainer clip and the lever. Preferably, all or at least the surface of the rotatable shaft is hardened to a suitable hardness to eliminate the need for nickel plating as previously employed in windshield wiper pivot joints. In this application, the retainer clip is hardened to a higher hardness than that of the rotatable shaft to ensure secure frictional engagement between the retainer clip and the rotatable shaft.

What is claimed is:

1. A windshield wiper pivot joint comprising:
    a rotatable shaft having first and second opposed ends and a uniform cross-section along at least a portion of a longitudinal length thereof;
    a housing surrounding the rotatable shaft and having opposed ends; and
    retainer clip means, axially engageable along the longitudinal length with the uniform cross-section and fixedly mounted adjacent one end of the rotatable shaft and the housing, for retaining the rotatable shaft and the housing in a fixed axial dimensional relationship while being rotatable with the shaft with respect to the housing, wherein the retainer clip means includes a plurality of spaced notches formed in a shaft-engaging surface and extending radially outward to define a discontinuous shaft-engaging surface.

2. A windshield wiper pivot joint comprising:
    a rotatable shaft having first and second opposed ends and a uniform cross-section along at least a portion of a longitudinal length thereof;
    a housing surrounding the rotatable shaft and having opposed ends; and
    retainer clip means, axially engageable along the longitudinal length with the uniform cross-section and fixedly mounted adjacent one end of the rotatable shaft and the housing, for retaining the rotatable shaft and the housing in a fixed axial dimensional relationship, the retainer clip means including:
        an annular body having a central aperture surrounded by a frusto-conical annulus, the portion of the frusto-conical annulus surrounding the aperture forming a shaft engaging edge which frictionally engages the rotatable shaft when the annular body is urged over the rotatable shaft, wherein the annular body includes a plurality of spaced notches formed in the shaft engaging surface of the body and extending radially outward from the aperture to form a discontinuous shaft engaging surface on the body.

3. The windshield wiper pivot joint of claim 2 further comprising:
    means, connected to the rotatable shaft for rotating the shaft.

4. The windshield wiper pivot joint of claim 3 further including biasing means mounted between the rotating means and the housing.

5. The windshield wiper pivot joint of claim 4 wherein the biasing means comprises a wave washer.

6. The windshield wiper pivot joint of claim 3 further comprising means for fixedly connecting the rotatable shaft to the rotating means.

7. The windshield wiper pivot joint of claim 6 wherein:
    the rotating means comprises a rotatable lever; and
    the connecting means comprises a rivet.

8. The windshield wiper pivot joint of claim 3 wherein the rotating means comprises a lever rotatably moved by drive means.

9. The windshield wiper pivot joint of claim 2 further comprising:
    an annular disc having a central aperture surrounded by a frusto-conical annulus, the annular disc mounted in frictional engagement with an opposite end of the rotatable shaft with respect to the annular body.

10. The windshield wiper pivot joint of claim 2 wherein the surface of the rotatable shaft is hardened.

11. The windshield wiper pivot joint of claim 10 wherein the annular body is hardened to a hardness greater than the hardness of the rotatable shaft.

12. The windshield wiper pivot joint of claim 2 wherein the notches are equi-circumferentially spaced about the shaft engaging surface of the body.

13. A windshield wiper pivot joint comprising:
    a rotatable shaft having first and second opposed ends and a uniform cross-section along at least a portion of a longitudinal length thereof;

means, connected to the rotatable shaft, for rotating the rotatable shaft;

a housing surrounding a portion of the rotatable shaft and having opposed ends; and retainer clip means, axially engageable along the longitudinal length with the uniform cross-section and fixedly mounted adjacent one end of the rotatable shaft and the housing, for retaining the rotatable shaft and the housing in a fixed axial dimensional relationship, the retainer clip means including:

an annular body having a central aperture surrounded by a frusto-conical annulus, the portion of the frusto-conical annulus surrounding the aperture forming a shaft engaging edge which frictionally engages the rotatable shaft when the annular body is urged over the rotatable shaft, wherein the annular body includes a plurality of spaced notches formed in the shaft engaging surface of the body and extending radially outward from the aperture to form a discontinuous shaft engaging surface on the body.

14. The windshield wiper pivot joint of claim 13 further including biasing means mounted between the rotating means and the housing.

15. The windshield wiper pivot joint of claim 14 wherein the biasing means comprises a wave washer.

16. The windshield wiper pivot joint of claim 13 in combination with a windshield wiper system wherein:

the rotating means comprises a rotatable lever connected at one end to an oscillatory rod driven by a drive motor; and means for fixedly connecting an opposed end of the lever to the rotatable shaft for simultaneous rotation of the lever and the rotatable shaft.

17. The windshield wiper pivot joint of claim 16 wherein:

the rotating means comprises a rotatable lever; and the connecting means comprises a rivet.

18. The windshield wiper pivot joint of claim 13 wherein the rotating means comprises a lever rotatably moved by drive means.

19. The windshield wiper pivot joint of claim 13 further comprising:

an annular disc having a central aperture surrounded by a frusto-conical annulus, the annular disc mounted in frictional engagement with an opposite end of the rotatable shaft with respect to the annular body.

20. The windshield wiper pivot joint of claim 13 wherein the rotatable shaft is hardened.

21. The windshield wiper pivot joint of claim 20 wherein the annular body is hardened to a hardness greater than the hardness of the rotatable shaft.

22. The windshield wiper pivot joint of claim 13 wherein the notches are equi-circumferentially spaced about the shaft engaging surface of the body.

23. A windshield wiper pivot joint comprising:

an elongated rotatable shaft having a uniform cross-section over at least a portion of a longitudinal length adjacent at least one end;

a rotatable lever fixedly attached to the elongated rotatable shaft;

a housing having opposed ends encircling a substantial portion of the rotatable shaft while leaving opposite ends of said elongated shaft free;

biasing means engageable between one end of the housing and the lever for biasing the housing away from the lever; and a first annular body having a central aperture surrounded by a frusto-conical annulus axially engageable on at least one end of the rotatable shaft having the uniform cross-section and axially engageable with one end of the housing, the first annular body frictionally engaging the rotatable shaft to retain the rotatable shaft and the housing in a fixed dimensional relationship with respect to the lever while the first annular body and the rotatable shaft are rotatable with respect to the housing, wherein the first annular body is hardened to a hardness greater than a predetermined hardness of the rotatable shaft, wherein the first annular body includes a plurality of spaced notches formed in a shaft-engaging surface of the first annular body and extending radially outward to define a discontinuous shaft-engaging surface on the body.

24. The windshield wiper pivot joint of claim 23 further comprising:

a second annular body axially engageable on the uniform cross-section of a longitudinal length adjacent an opposite end of the rotatable shaft with respect to the first annular body and axially in engagement with an opposite end of the housing, the second annular body frictionally engaging the rotatable shaft.

25. A method of assembling the windshield wiper pivot joint of claim 23 comprising the steps of:

fixedly attaching the elongated rotatable shaft to the rotatable lever;

mounting the housing having opposed ends about the rotatable shaft;

mounting the biasing means between one end of the housing and the lever for biasing the housing away from the lever;

axially mounting the first annular body having the central aperture surrounded by the frusto-conical annular on the rotatable shaft and axially into engagement with one end of the housing, the first annular body frictionally engaging the portion of the longitudinal length of the rotatable shaft with the uniform cross-section to retain the rotatable shaft and the housing in a fixed dimensional relationship with respect to the lever while the first annular body and the rotatable shaft are rotatable with respect to the housing; and prior to assembly, hardening the first annular body to a hardness greater than a predetermined hardness of the rotatable shaft.

26. In a windshield wiper pivot joint including an elongated rotatable shaft fixedly attached to a rotatable lever, a stationary housing having opposed ends sheathingly mounted about a portion of the rotatable shaft, and biasing means mounted between one end of the housing and the lever for biasing the housing away from the lever, the improvement comprising:

a first annular body having a central aperture surrounded by a frusto-conical annulus frictionally mounted in axial direction on a first uniform cross-section of at least a first portion of a longitudinal length of the rotatable shaft to retain the rotatable shaft and the housing in a fixed dimensional relationship with respect to the lever, such that the first annular body and the rotatable shaft are rotatable with respect to the housing, wherein the first annular body is hardened to a hardness greater than a predetermined hardness of the rotatable shaft, so that the first annular body frictionally engages the rotatable shaft to resist disengaging movement of the first annular body with respect to the shaft with a force of approximately 3K newton;

a second annular body frictionally mounted in axial direction along a second uniform cross-section of at least a second portion of the longitudinal length of the rotatable shaft adjacent an opposite end of the rotatable shaft with respect to the first annular body, the second annular body frictionally engaging the rotatable shaft to resist disengaging movement of the second annular body with respect to the shaft with a force of approximately 3K newton;

the surface of the rotatable shaft hardened to a predetermined hardness of between approximately 32 $R_c$ and 35 $R_c$ inclusive; and the first annular body and the second annular body hardened to a hardness of between approximately 42 $R_c$ and 45 $R_c$ inclusive.

27. In a windshield wiper pivot joint including a rotatable shaft having first and second opposed ends, a lever mounted on one end of the shaft, a housing surrounding at least a portion of the shaft and having opposed ends, and biasing means mounted between one end of the housing and the lever for normally urging the housing away from the lever, the improvement comprising:

the rotatable shaft having a first uniform cross-section along at least a first portion of a longitudinal length adjacent one end thereof; and retainer means including a frictionally engaged first annular body having a central aperture surrounded by a frusto-conical annulus mounted in axial direction on the first uniform cross-section portion adjacent at least one end of the shaft, the retainer means for rotatably retaining the shaft and the first annular body with respect to the housing and at a fixed dimensional relationship with respect to the lever, wherein the retainer means includes a plurality of spaced notched formed in a shaft-engaging surface and extending radially outward to define a discontinuous shaft-engaging surface.

28. The improvement of claim 27 further comprising:

the rotatable shaft having a second uniform cross-section along at least a second portion of a longitudinal length adjacent a second end thereof; and said retainer means including a frictionally engaged second annular body having a central aperture surrounded by a frusto-conical annulus mounted in axial direction on the second uniform cross-section portion adjacent an opposite end of the shaft from the first annular body, the retainer means for rotatably retaining the shaft and the second annular body with respect to the housing and at a fixed dimensional relationship with respect to the first annular body.

* * * * *